United States Patent
Tsuji (10) Patent No.: US 7,218,979 B2
(45) Date of Patent: May 15, 2007

(54) CAD SYSTEM UTILIZING A NETWORK

(75) Inventor: Aki Tsuji, 3-13-3 Kamoe, Hamamatu-shi, Sizuoka-ken 432-8023 (JP)

(73) Assignee: Aki Tsuji (JP)

( * ) Notice: Subject to any disclaimer, the term of this patent is extended or adjusted under 35 U.S.C. 154(b) by 789 days.

(21) Appl. No.: 10/308,325

(22) Filed: Dec. 3, 2002

(65) Prior Publication Data

US 2003/0128232 A1  Jul. 10, 2003

Related U.S. Application Data

(63) Continuation-in-part of application No. 09/316,863, filed on May 21, 1999, now abandoned.

(51) Int. Cl.
*G06F 19/00* (2006.01)

(52) U.S. Cl. .......................... 700/97; 700/98; 700/182; 715/744

(58) Field of Classification Search .................. 700/97, 700/98, 105, 115, 116, 182; 703/1, 6, 7, 703/21; 715/700, 736, 744
See application file for complete search history.

(56) References Cited

U.S. PATENT DOCUMENTS

| | | | | |
|---|---|---|---|---|
| 5,339,247 A | * | 8/1994 | Kirihara et al. ............. | 700/106 |
| 6,542,937 B1 | * | 4/2003 | Kask et al. .................. | 700/182 |
| 6,629,093 B1 | * | 9/2003 | Davis et al. ................ | 700/182 |
| 6,647,305 B1 | * | 11/2003 | Bigelow ..................... | 700/182 |
| 2001/0047251 A1 | * | 11/2001 | Kemp ......................... | 703/1 |
| 2002/0016725 A1 | * | 2/2002 | Eichstaedt et al. ............. | 705/7 |

FOREIGN PATENT DOCUMENTS

| | | |
|---|---|---|
| JP | H01-145774 | 6/1989 |
| JP | H06-037934 | 10/1994 |
| JP | H07-036947 | 2/1995 |
| JP | H09-106417 | 4/1997 |
| JP | H10-086199 | 4/1998 |
| JP | H11-143927 | 5/1999 |
| JP | H11-282884 | 10/1999 |

* cited by examiner

*Primary Examiner*—Leo Picard
*Assistant Examiner*—Charles Kasenge
(74) *Attorney, Agent, or Firm*—Akerman & Senterfitt; Stephan A. Pendorf (57) ABSTRACT

Providing the CAD system utilizing the network that does not need to prepare the graphic data beforehand and can provide the parametric graphic data that user expected promptly by simple order. The present invention of CAD system comprises server computer 1 and client computer 2 that are connected through the Internet 3. Server computer 1 is comprising Internet service interface program section 11, parts database administration program filing section 12, parts data list filing section 13, variable program file storing section 14, real data filing section 15, reformatting program filing section 16 and operation processing section 17.

5 Claims, 6 Drawing Sheets

CAD SYSTEM UTILIZING A NETWORK

CROSS-REFERENCE TO RELATED APPLICATIONS

This application is a continuation-in-part of Ser. No. 09/316,863, filed May 21, 1999 now abandoned, entitled "A CAD SYSTEM UTILIZED NETWORK," the disclosure of which is incorporated herein by reference.

BACKGROUND OF THE INVENTION

1. Field of the Invention

The present invention relates to an art sending graphic data for CAD from server computer that is connected with network, for example, Internet etc., to client computer.

2. Description of the Prior Art

Graphic data, which shows various parts, are built in usual CAD systems. However, in case of CAD system for machine design, as there are so many kinds of parts to treat, and there need to plural graphic data on front elevation, side view and the like, even a same part, it is inevitable to rise costs to store many kinds of parts in graphic data to each computer because a large capacity of storage shall be needed.

Further, in case of registering new parts or updating the existing parts of graphic data, plural drawing data shall be added or amended for one part.

Recently, the services that provide different information and data through Internet are done actively, and can be also thought that it provides a CAD system utilizing an Internet.

For example, storing graphic data for CAD to server which connected with Internet before hand, it is also feasible that the systems provide the graphic data from server to user through the Internet.

In case of such a kind of CAD system, the advantage is that user sides need not store the parts data for CAD, however, server sides have to previously store so many kinds of parts data corresponding to different parts.

Further, in case of creating machine design, parts that have same shape but different size may be used, however, from the point of data capacity, it is almost impossible to store the different size of all parts data for server sides individually. Further, since data format on graphic data are also different, when the CAD software used by user are different from sorts server sides have need to prepare the graphic data for each data format beforehand and large capacity of storage will be needed. Further, at the server side, when a new part will be added or existing drawing data will be updated, so many graphic data will have to be amended at the same time and data management will take trouble and be high costs.

The present invention was done following to like this point and it's object is providing the CAD system utilizing the network that does not have to prepare the graphic data beforehand and can provide the graphic data that user expect rapidly by simple order.

As described above in detail, according to the present invention, the graphic data need not to be prepared before hand in the server computer or client computer. Because of complying with demands from user, graphic data are created assigning the certain real data to each variable of the certain variable programs, and the created graphic data are sent from server computer to client computer. To do this, the costs of entirety systems can be reduced and many kinds of graphic data can be provided to user easily and promptly.

Especially, it is possible to provide the CAD system that is very convenient and high performance because of optional graphic data can be provided for many users through the network by CAD data format that each user expects.

Further, if user enter the variable data of measure etc., it is possible to provide the high quality and high reliability graphic data through easy procedure because graphic data is created arranging the entry data.

Further, by updating the real data or variable programs, it is possible to provide the newly parts of the graphic data to many users rapidly.

Furthermore, graphic data created by CAD system of prior art is "vector" data. Many companies have tried to make CAD system can create "parametric" graphic data, but the companies never made the CAD system.

SUMMARY OF THE INVENTION

It is an object of the present invention to provide the CAD system utilizing the network that does not have to prepare the graphic data beforehand and can provide the parametric graphic data that user expect rapidly by simple order.

So as to satisfy these objects, the present invention provides a CAD system utilizing a network comprising a server computer connected with the network, and at least one client computer transmitting data between the server computer through the network, a parametric graphic data for CAD from the server computer to the client computer complying requests from the client computer; the server computer having a variable program filing section that files multiple variable programs to draw each different graphics, a real data filing section that stores multiple kinds of real data that is substituted for each variables in the variable program, an operation processing section that reads out a certain real data from the real data storing section with reading out a certain variable program from the drawing program section corresponding to requests from the client computer, creates a parametric graphic data substituting the a certain real data for each variables in the a certain variable program and executing the program and a display data creating device which create display data that enable to display on a display in the client computer, based on a parametric graphic data created by the operation processing section.

According to the present invention, the parametric graphic data need not to be prepared before hand in the server computer or client computer. Because of complying with demands from user, parametric graphic data are created assigning the certain real data to each variable of the certain variable programs, and the created parametric graphic data are sent from server computer to client computer. To do this, the costs of entirely systems can be reduced and many kinds of parametric graphic data can be provided to user easily and promptly.

Especially, it is possible to provide the CAD system that is very convenient and high performance because of optional parametric graphic data can be provided for many users through the network by CAD data format that each user expects.

Further, if user enter the variable data of measure etc., it is possible to provide the high quality and high reliability parametric graphic data through easy procedure because parametric graphic data is created arranging the entry data.

Further, by updating the real data or variable programs, it is possible to provide the newly parts of the parametric graphic data to many users rapidly.

To solve the above problems, the present invention has a server computer connected with a network and at least one client computer transmitting parametric graphic data for CAD from said server computer to said client computer complying request from said client computer, comprising said server computer that has a variable program filing section that files multiple variable programs to draw each different graphics, a real data filing section that stores multiple kinds of real data that is substituted for each variables in said variable program, an operation processing section that reads out a certain real data from said real data storing section with reading out a certain variable program from said drawing program section corresponding to requests from said client computer, creates a parametric graphic data substituting said a certain real data for each variables in said a certain variable program and executing said program and a display data creating device which create display data that enable to display on a display device in said client computer, based on a parametric graphic data created by said operation processing section.

The feature point of the composition in a present invention is the following construction.

An operation processing section that reads out a certain real data from the real data storing section with reading out a certain variable program from the variable program section corresponding to requests from the client computer, creates a parametric graphic data substituting the a certain real data for each variables in the a certain variable program and executing the program.

Namely, not the vector data that is common CAD data, parametric graphic data is stored in a server side, it is called based on the demand from a client, CAD data (vector data) is created, and to transmit it to the client computer. This is the one of the future of the present invention.

By the above-mentioned composition, the present invention has following remarkable advantages. The capacity of the data of a figure decreases very much. In case in which the part form is the same, and figure data has a difference in many sizes, form of many parts can be simultaneously changed by correcting only a variable program. That is, in case in which form of many same form parts of different size are changed, it is unnecessary to change form of each part with which a size is different. Therefore, data capacity also becomes small and it very becomes easy to carry out data management. If in other words the contents of a variable and the form of parts are decided, a variable program is one. By giving a numerical value to the variable program, the parts of the size difference among a large number more can be generated. For example, if a variable program whose length of one side is the equilateral triangle of A changed a variable program whose one side is the right quadrangle of A, it means that, as for all data, it changed from many equilateral triangles of different size to many right quadrangles of different size. The size becomes the value (numerical value) of A.

The figure data can be distributed to a client through a network. Therefore, the present invention, as the figure data distribution method through networks, such as the Internet, has excellent advantages in data capacity, data management, data distribution speed, etc.

Cited application documents of Hoskins (U.S. Pat. No. 6,108,662), Morgenstern (U.S. Pat. No. 5,970,490) and Vogler (U.S. Pat. No. 5,815,683), and have neither an indication nor suggestion about the about-mentioned constitution and advantages.

Therefore, if the cited inventions do not aggregate to the present invention and don't have the remarkable advantages, thus, the present invention is not denied from the above-mentioned cited application.

In addition, about invention of Chipman (U.S. Pat. No. 6,038,668), it does not change with a cited application by filing of a priority certificate.

Further, as shown in the first response, not the vector data that is common CAD data, parametric graphic data is stored in a server side, it is called based on the demand from a client, CAD data (vector data) is created, and to transmit it to the client computer. This is the one of the future of the present invention. Nobody can create parametric graphic data in CAD System.

Further, in any of the cited documents there is no indication of the construction which is the feature point of the present invention. The operation processing section of the present invention reads out a certain variable program and a certain real data that are stored in a server side computer corresponding to a request from the client computer, creates vector data of a figure in a server side computer, and sends it to the client computer.

Namely, the real data in the present invention is substituted for each variable in the variable program to create graphic data. The real data is set corresponding to model numbers of parts. When a user selects a model number of a part by operating the client computer, graphic data requested by the user is created in a server side computer.

Thus, since graphic data requested by the user are created from the variable program and the real data, the present invention has the following characteristic advantages that are not shown in any of the cited documents. Neither the server computer nor the client computer needs to prepare the graphic data beforehand; cost for the entire system can be reduced; and various graphic data can be provided easily and rapidly to the user.

Cited application documents of Hoskins, Morgenstern and Vogler, and have neither an indication nor suggestion about the above-mentioned constitution and advantages.

Therefore, since there are clear differences between the present invention and each cited document with regard to the construction and the advantage, the present invention has inventive steps.

DETAILED DESCRIPTION OF THE INVENTION

Now, the present invention concerned to a CAD system will be described referring to drawings concretely. The following CAD system is characterized in that user create parts data on server computer corresponding to machine parts selected on client computer and send the created parts data to client computer through Internet.

Figure 1:
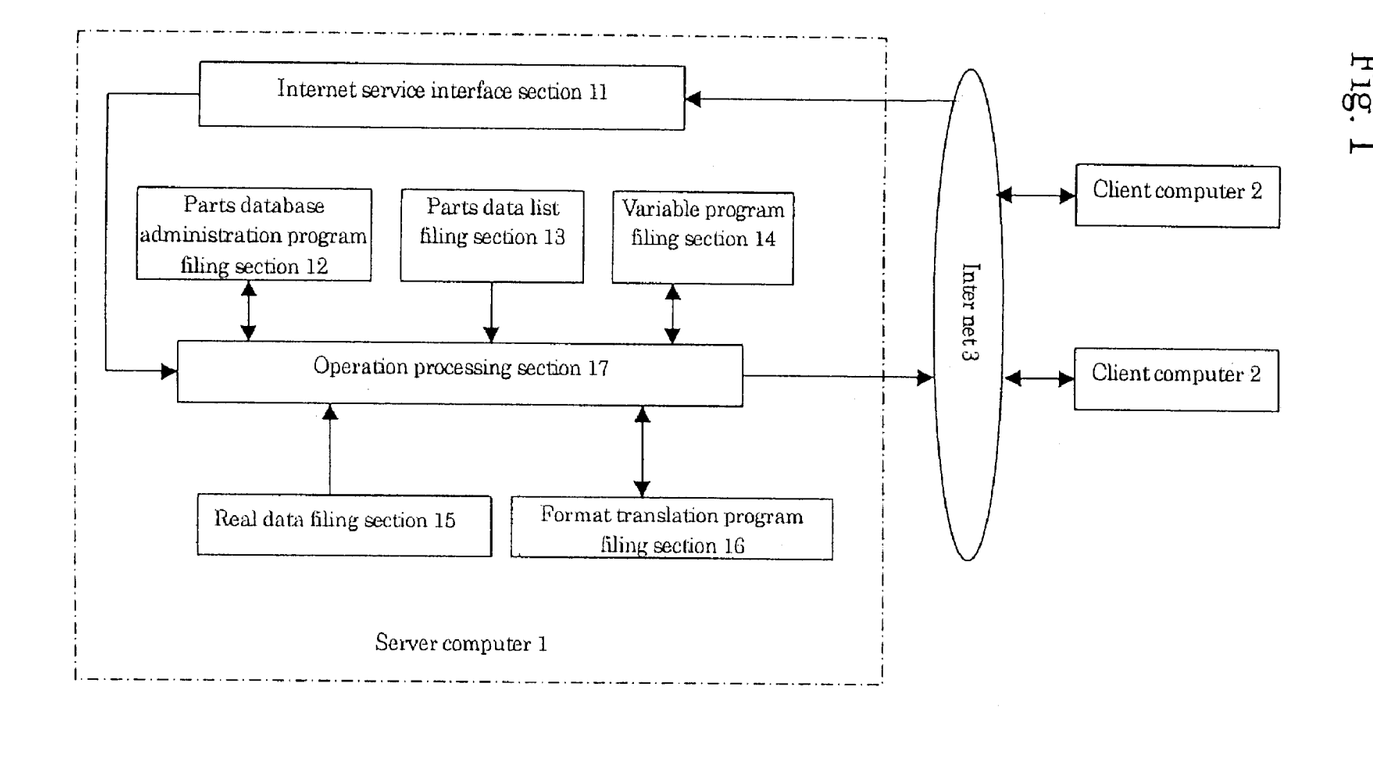
FIG. 1 is a block diagram showing schematic composition of a CAD system of the present invention.

FIG. 1 is block diagram showing schematic composition of the CAD system. As shown in the figure, a server computer 1 and a client computer 2 are connected through an Internet 3. The server computer 1 is comprising an Internet service interface program section 11, a parts database administration program filing section 12, a parts data list filing section 13, a variable program file storing section 14, a real data filing section 15, a reformatting program filing section 16 and an operation processing section 17.

The Internet service interface program 11 conducts initiating the server side's program from client side and substituting both of data.

A parts data list filing section 13 files parts data list that format number of parts and real data that is corresponding to the format number of parts are lined in a list form. The parts data administration program filing section 12 files programs to create a parts format number list selected the user, etc., and to input-output the data.

The variable program file storing section 14 stores program files to create parametric graphic data corresponding to parts selected by user. The real data filing section 15 stores real data for substituting each variable in the variable program file.

The reformatting program filing section 16 stores programs to convert the created parametric graphic data into a data format that user specified.

The operation processing section 17 conducts above described different programs and then conducts a process sending the execution result to the client computer 2.

Figure 2:
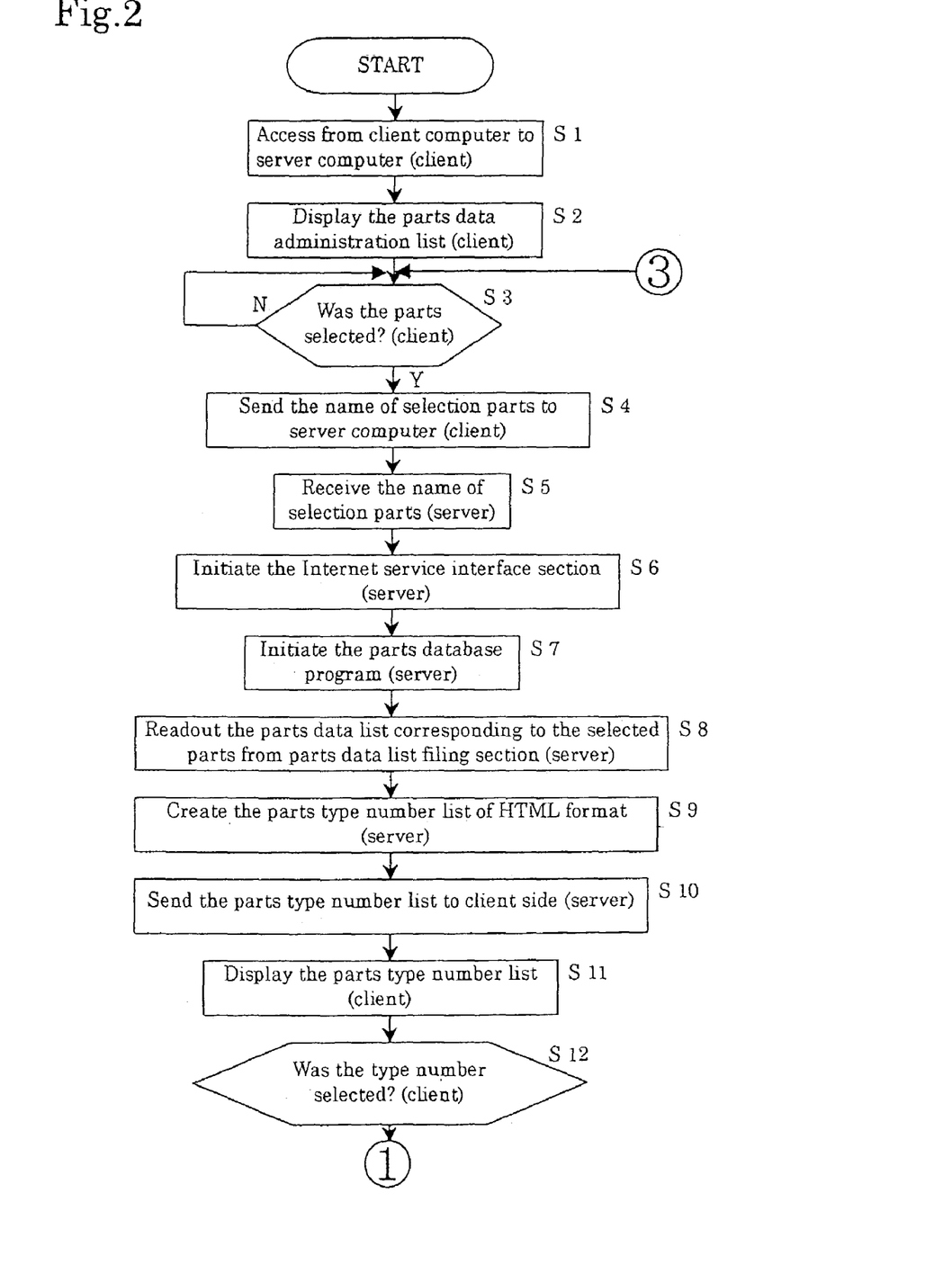
FIG. 2 is a flowchart showing process action of CAD system illustrated in FIG. 1.
Figure 3:
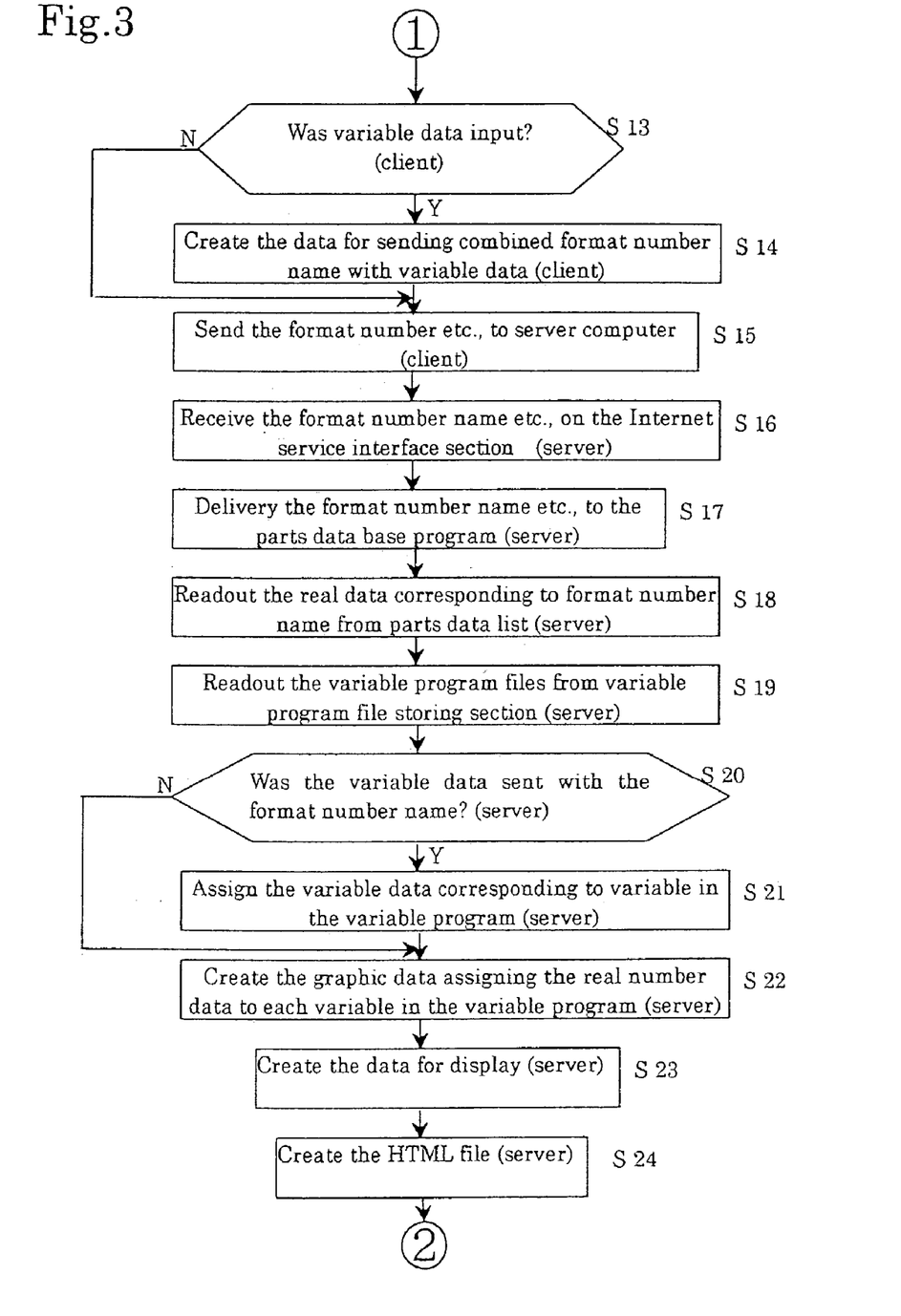
FIG. 3 is a flowchart continuing FIG. 2.
Figure 4:
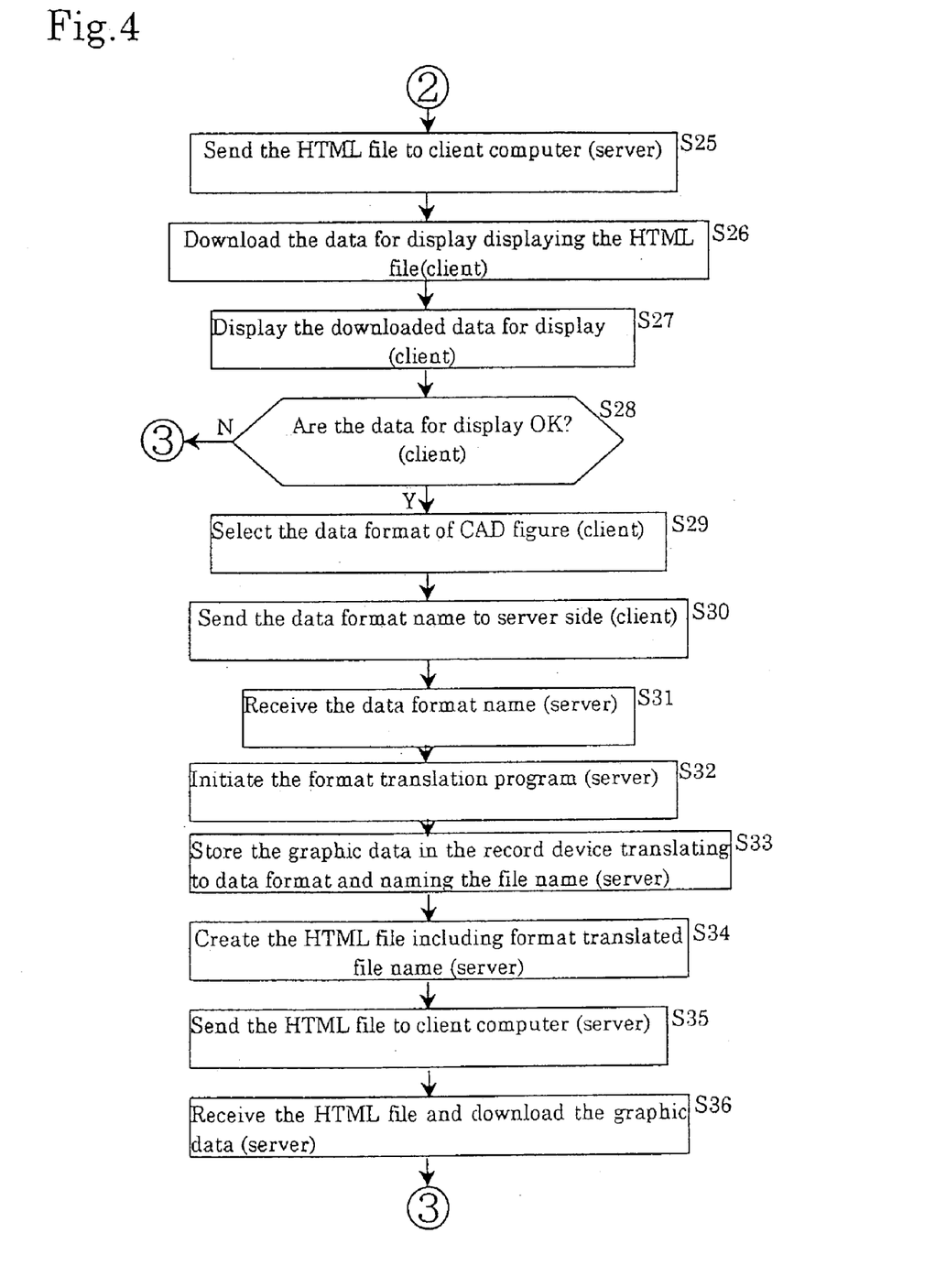
FIG. 4 is a flowchart continuing FIG. 3.

FIG. 2 to FIG. 4 are flowchart showing processing action of the CAD system as shown in FIG. 1, and now, based on this flow chart, there will be described an action of the CAD system for present embodiments.

First, as shown in Step S1 of FIG. 2, the server computer 1 is accessed from the client computer 2 through the Internet 3. On a display screen of the client computer 2, as shown in Step S2, a parts data administration list is displayed. This list shows a parts list that the client side is able to select, that the user can select the optional parts in the list by mouse, etc.

Still, the parts data administration list will allow to be filed into a memory at the client side or to be called from the server side when it needs.

Next, as shown in Step S3, it is judged that whether the user selected the parts from the parts data administration list by the mouse etc. In case that the user selected the parts, the process goes to Step S4 and the selected parts name is sent to the server computer 1. After the server computer received the selected parts name (Step 5), the Internet service interface program section 11 is initialized by the selected parts as a command argument (Step S6).

Next, as shown in Step S7, the server computer 1 initialize the parts database administration program which is storing at the parts database administration program storing section 12. The parts data list corresponding to the parts that the user selected are read out from the parts data list filing section 13 (Step S8), then, based on the parts data list, the parts database administration program create a parts format database list for HTML (Hyper Text Markup Language) format. Next, as shown in Step S10, the server computer 1 transmit the created parts format number list to the client computer 2 through the Internet service interface program section 11.

The client computer 2 receive the parts format number list, then as shown in Step S11, display the parts format number list using a browser etc. Next, the client computer 2 judges whether the user selected which format numbers from among the parts format number list using the mouse etc., (Step S12). When the user select the format number, then the client computer 2 judges whether the user entered the variable data corresponding to the selected format number (Step S13 of FIG. 3).

In case that user entered the variable data, as shown in Step S14, sending data, that bind the format number name selected by the user with the variable data, are created, then the data are sent to the server computer 1 (Step S15).

On the other hand, in Step S13, in case that the client computer judged that the user did not enter the variable data, the format number name selected by the user is sent to the server computer 1 (Step S15).

The data sent from the client computer 2 is received at the Internet service interface program section 11 in the server computer 1 (Step S16), then delivered to the parts database administration program (Step S17).

The parts database administration program read out the real data corresponding to the format number name selected by the user, from the parts data list (Step S18), then read out the variable program files that is corresponding to the parts name selected by the user from the variable program file storing section 14 (Step S19).

Next, the server computer 1 judges whether the variable data was sent with the format number name from the client side (Step S20). In case that the variable data was sent, as shown in step S21, the variable data will be assigned to the variables. The variable data sent from the client computer is assigned to each variable corresponding to among the variable program files.

Next, as shown in Step S22, the operation processing section 17 of the server computer 1 create the parametric graphic data in each variables of among variable program files assigning the real data that read out at Step S18, the real data is parameter corresponding to the format number selected by the user. In describing more detail, the variable program files were read line by line, the segment coordinate that shows shape of the parts was calculated by running the commands and/or functions described to each lines in order, and the parametric graphic data in accordance with the arithmetic result.

Next, as shown in Step S23, based on the created parametric graphic data, the server computer 1 create the display data to display on the display device in the client computer 2, named the file name and store it at a recorder. The display data is created by a data format that can process in general-purpose operating system, for example, GIF file, DWF file, JPG file and the like on Windows or UNIX.

Next, as shown in Step 24, the server computer 1 create the HTML data that described the file name for the display data to download the display data in the client computer 2.

Next, as shown in Step S25 of FIG. 4, the server computer 1 sends the created HTML data to the client computer 2 through the Internet service interface program section 11.

As shown in Step S26, the client computer 2 receive the HTML data sent from the server computer 1, then download the display data. Next, as shown in Step S27, the client computer displays the downloaded display data on the display device.

Next, as shown in Step S28, the client computer requests the confirmation to the user whether the graphic that was displayed on the display device is met the user's requirements. If the graphic is against the user's request, return to Step S3 of FIG.3 and select the parts over again. If the parametric graphic data is met the user's request, as shown in Step S29, makes the user select the data format of CAD drawings. The reason to settle this process is that data format of a CAD software is not united. In Step S29, makes the user select the data format: DXF file, DWG file, IGES file, BMI file etc., corresponding to the CAD software used by the user.

Next, as shown in Step S30, the client computer 2 sends the data format name selected by the user to the server computer 1.

The server computer 1 receives the data format name at the Internet service interface program section 11 (Step S31), then read out the form conversion program corresponding to the data format selected by the user from the form conversion program storing section 16 and initiate the read out the program (Step S32).

As shown in Step S33, form the conversion program converts the parametric graphic data that was created in Step S22 into the data format selected by the user, names new file name and stores in the recorder.

Next, as shown in Step S34, the server computer 1 creates the HTML data described the file name of the CAD parametric graphic data to be able to download the format converted CAD parametric graphic data in the client computer 2.

Next, as shown in Step S35, the server computer 1 sends the created parametric graphic data to the client computer 2. As shown in Step S36, the client computer 2 receive the HTML data sent from the sever computer 1, then download the CAD parametric graphic data. Then the downloaded CAD parametric graphic data is displayed on the CAD screen responding to the user's directions.

Summarizing above mentioned processing action in FIG. 2 to FIG. 4 of flowchart in Step S1 to Step S17, when the user select the parts, the list of parts format number corresponding to the parts are displayed and makes the user select the parts format number. Next, in Step S18 to Step S24, the arithmetic operation is conducted assigning the real data corresponding to the format number selected by the user in the variable program files corresponding to the parts data selected by the user in each variables. Based on the arithmetic results, the display data is created to show on the display device in the client computer 2. Next, in Step S25 to Step S36, the display data is converted into the data format specified by the client computer 2, then downloaded in the client computer 2.

Thus, in present embodiment, the graphic data is not to be needed to prepare in the client computer before hand since the parametric graphic data that the user needs is downloaded on each occasion from the server computer 1 to the client computer 2. Further, the server computer also needs not prepare the graphic data before hand because it creates the parametric graphic data using the variable program files and the real data when the user requests.

Only select the desired parts from a parts table displayed on the screen, the user can obtain the parametric graphic data corresponding to the parts. Also, the user can obtain the particular parts of the parametric graphic data by simple procedure because the user can input the variable data about measure value etc., of parts before hand. Also, the server computer 1 can easily create the different size of parametric graphic data and provide the high quality and high reliability parametric graphic data since it create the parametric graphic data assigning the real data to each variables in the variable program files.

Further, the user can build the original parametric graphic database at extremely low cost using the downloaded parametric graphic data to the client computer. If such a kind of database is built, it is possible to recycle or amend the downloaded parametric graphic data, in result, the user can obtain the convenient and no-useless database.

Figure 5:
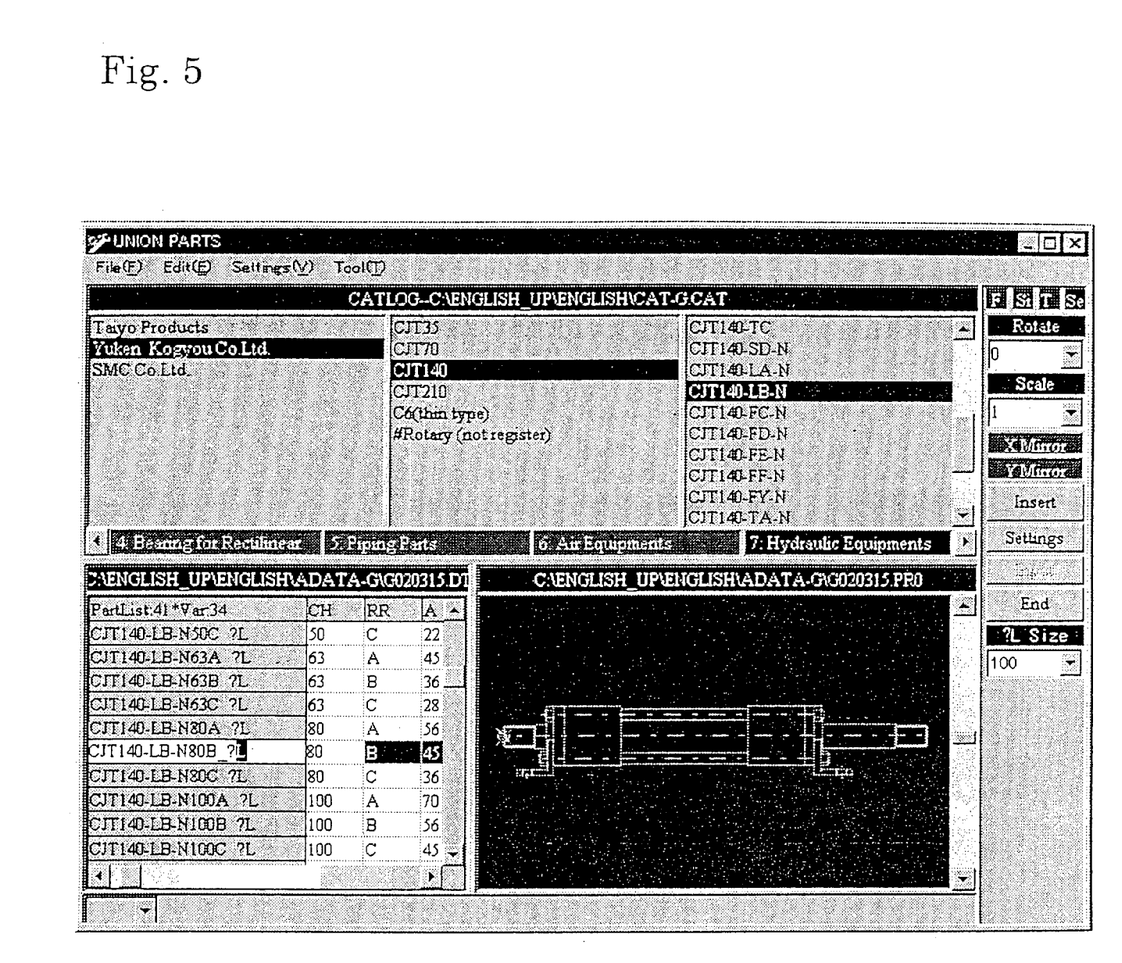
FIG. 5 is a figure showing an example of screen display showed in display device in client computer.

FIG. 5 is an example of the screen display displayed in the display device in the client computer 3. The screen of FIG. 5 indicates examples selecting and displaying the parts of hierarchical structure. In the screen, display area W1 displays the first parts table selecting the parts of first hierarchy. Display area W2 displays the second parts table selecting the parts of second hierarchy as an object the parts selected at the first parts table. Display area W3 displays the third parts table selecting the parts of third hierarchy as an object the parts selected at the second parts table. Display area W4 displays the fourth parts table selecting the parts of fourth hierarchy as an object the parts selected at the third parts table. The parts selection of these first to fourth parts table is corresponding to the process in Step S3 of FIG. 2.

Further, at the display area W5 in the screen of FIG. 5, the list of parts format number that is corresponding to the selected parts is displayed, and at the right side of the display area W6, the variable data which is corresponding to each parts format number is displayed. These display area W5, W6 are displayed conducting the process of Step S11 in FIG. 2.

Further, at the display area W7 in the screen of FIG. 5, the display data that the client computer 2 downloaded is displayed by processing Step S26 of FIG. 4.

Figure 6:
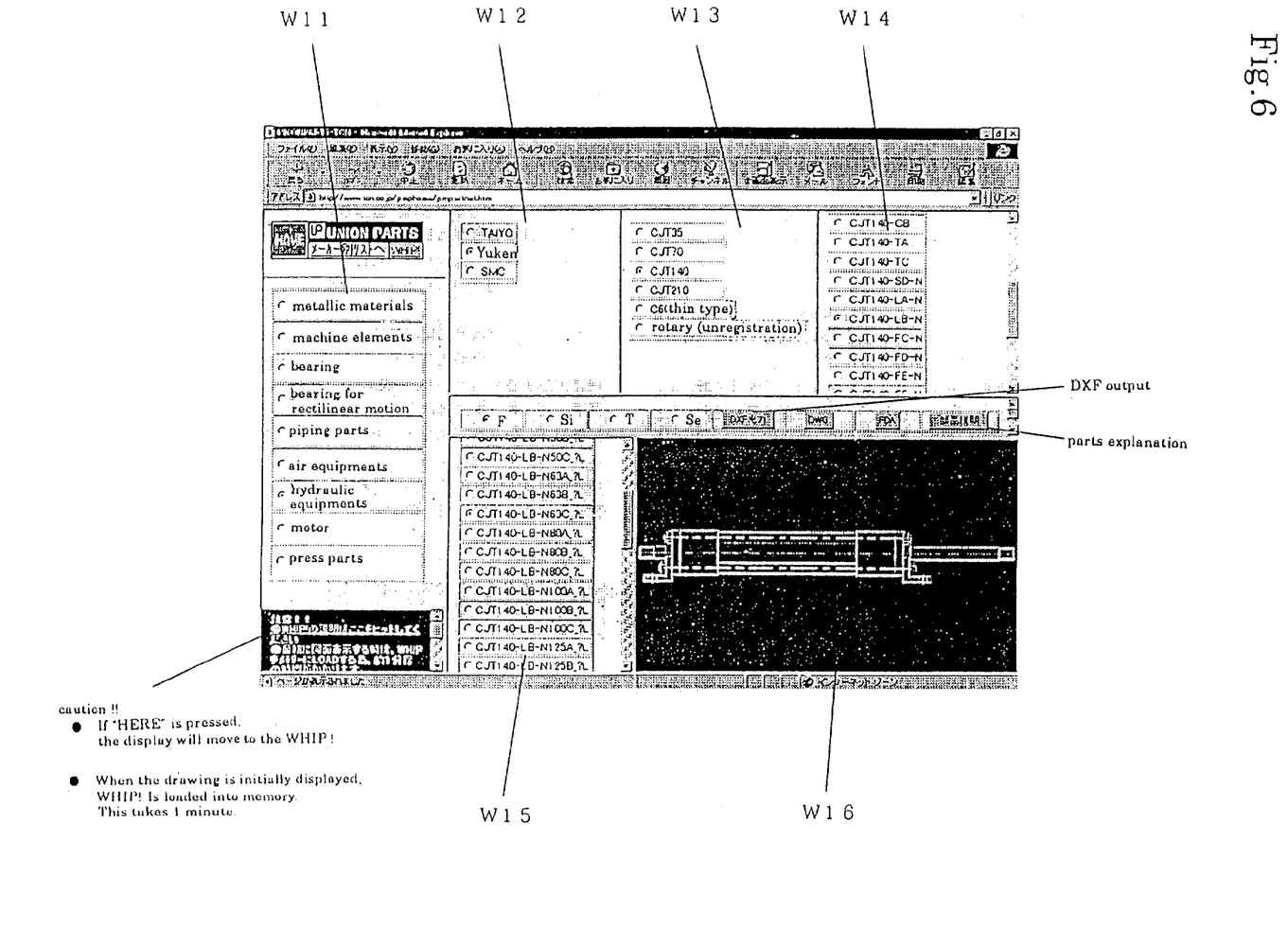
FIG. 6 is a figure showing an example conducting selection and display of parts utilizing a general-purpose browse.

On the other hand, FIG. 6 is an example selecting and displaying the parts utilizing a general-purpose browser. The displayed contents on the screen of FIG. 6 are basically as same as FIG. 5. In each area of display area W11 to W14, the first to the fourth parts table is displayed. In display area W15, the list of selected parts of format number is displayed. In display area W16, display data that the client computer 2 downloaded is displayed.

As shown in FIG. 5 and FIG. 6, selecting the parts following to a menu that displayed on the screen in the client computer, the user can obtain the parametric graphic data corresponding to the described parts easily and promptly.

Above described embodiment, an example of creating the two dimension parametric graphic data is explained. If the variable program file or the real data is amended, three dimension parametric graphic data can be also created.

Further, above described embodiment, an example of creating parametric graphic data in machine parts is explained. In case creating parametric graphic data of electric part; transistor, diode and the like, and architectural parts of parametric graphic data, the present invention is also applicable.

Further, above described embodiment, an example that the server computer 1 and the client computer 2 are connected through the Internet 3 is explained. In case that the server computer and the client computer are connected with different networks except the Internet 3, the present invention is applicable.

What is claimed is:

1. A CAD system utilizing a network comprising a server computer connected with the network, and at least one client computer transmitting data between the server computer through the network,
   a parametric graphic data for CAD from the server computer to the client computer complying requests from the client computer;
   the server computer having a variable program filing section that files multiple variable programs to draw each different graphics,
   a real data filing section that stores multiple kinds of real data that is substituted for each variables in the variable program,
   an operation processing section that reads out a certain real data from the real data filing section with reading out a certain variable program from the variable program filing section corresponding to requests from the client computer, creates a parametric graphic data substituting the certain real data for each variables in the certain variable program and executing the program; and a display data creating device which creates display data that enable to display on a display in the client computer, based on the parametric graphic data created by the operation processing section;

wherein the client computer has a graphic list display control section displaying a graphic list that is able to provide a parametric graphic data from the server computer on a display and a selected graphic name transmitting section that sends a graphic name selected from the graphic list to the server computer, and the operation processing section in the server computer reads out the certain variable program and the certain real data based on the graphic name sent from the selected graphic name transmitting section; and wherein the server computer includes a parts data list storing section which stores a parts format number pairing with the real data which corresponds to each format number about each parts that enable to graphic drawings and a parts format number list transmitting section that creates a part format number list corresponding to graphic name sent from the selected graphic name transmitting section in the client computer based on a data stored in the parts data list storing section and sends to the client computer, the client computer includes a format number list display control section that makes a parts format number list display on a display sent from the parts format number list transmitting section and a selecting format number name transmitting section that sends a parts format name sent from the parts format number list transmitting section to the server computer, and the operation processing section in the server computer reads out the real data corresponding to a format number name sent from the selected format number name transmitting section from the selected parts format name transmitting section and creates a parametric graphic data substituting read out real data for each variables in variable program corresponding to graphic name sent from the selected graphic name transmitting section.

2. The CAD system as claimed in claim 1, wherein the selected format number name transmitting section in the client computer sends a selected format number name and variable data corresponding to a selected format number name together to the server computer in case a variable data corresponding to selected parts format number is input by user, and the operation processing section in the server computer creates a parametric graphic data substituting the real data read out from the parts data list storing section and the variable data sent from the selected format number name transmitting section for each variables in corresponding to the variable program.

3. The CAD system as claimed in claim 1, wherein the client computer has a selected data format name transmitting section sends a data format name of CAD software selected by user to the server computer, and the server computer has a CAD parametric graphic data creating section that reformats a parametric graphic data created by the operation processing section and creates a CAD parametric graphic data in a data format sent from the selected data format transmitting section.

4. The CAD system as claimed in claim 3, wherein the server computer has a first HTML data transmitter that creates a first HTML data describing a file name of the CAD parametric graphic data and sends to the client computer, and the client computer has a CAD parametric graphic data download device that downloads corresponding to the CAD parametric graphic data from the server computer based on the file name described in the first HTML data.

5. The CAD system as claimed in claim 1, wherein the server computer has a second HTML data transmitter that creates a second HTML data describing a file name of the display data and sends to the client computer, and the client computer, based on the file name described in the second HTML data, has a display control device.

* * * * *